United States Patent
Duong et al.

(10) Patent No.: US 11,508,359 B2
(45) Date of Patent: Nov. 22, 2022

(54) USING BACKPROPAGATION TO TRAIN A DIALOG SYSTEM

(71) Applicant: Oracle International Corporation, Redwood Shores, CA (US)

(72) Inventors: Thanh Long Duong, Seabrook (AU); Mark Edward Johnson, Castle Cove (AU)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 143 days.

(21) Appl. No.: 17/002,229

(22) Filed: Aug. 25, 2020

(65) Prior Publication Data

US 2021/0074269 A1    Mar. 11, 2021

Related U.S. Application Data

(60) Provisional application No. 62/898,680, filed on Sep. 11, 2019.

(51) Int. Cl.
*G10L 15/16*        (2006.01)
*G10L 15/06*        (2013.01)
(Continued)

(52) U.S. Cl.
CPC .............. *G10L 15/16* (2013.01); *G06N 3/084* (2013.01); *G06N 20/00* (2019.01); *G10L 15/063* (2013.01);
(Continued)

(58) Field of Classification Search
CPC ....... G10L 15/16; G10L 15/063; G10L 15/22; G10L 2015/223; G06N 3/084; G06N 20/00
See application file for complete search history.

(56) References Cited

U.S. PATENT DOCUMENTS 9,946,514 B1 *  4/2018  Kostello ............. G10L 15/1815
10,262,062 B2 *  4/2019  Chang ................. G06F 16/3329
(Continued)

FOREIGN PATENT DOCUMENTS

EP          1187440 A2 *  3/2002  ............. G10L 15/18
WO    WO-2018081163 A1 *  5/2018  ............. G10L 13/02

*Primary Examiner* — Mohammad K Islam
(74) *Attorney, Agent, or Firm* — Kilpatrick Townsend & Stockton LLP

(57) ABSTRACT

Techniques described herein use backpropagation to train one or more machine learning (ML) models of a dialog system. For instance, a method includes accessing seed data that includes training tuples, where each training tuple comprising a respective logical form. The method includes converting the logical form of a training tuple to a converted logical form, by applying to the logical form a text-to-speech (TTS) subsystem, an automatic speech recognition (ASR) subsystem, and a semantic parser of a dialog system. The method includes determining a training signal by using an objective function to compare the converted logical form to the logical form. The method further includes training the TTS subsystem, the ASR subsystem, and the semantic parser via backpropagation based on the training signal. As a result of the training by backpropagation, the machine learning models are tuned work effectively together within a pipeline of the dialog system.

20 Claims, 8 Drawing Sheets

(51) Int. Cl.
　　　*G06N 3/08* 　　　(2006.01)
　　　*G06N 20/00* 　　(2019.01)
　　　*G10L 15/22* 　　(2006.01)

(52) U.S. Cl.
　　　CPC ........ *G10L 15/22* (2013.01); *G10L 2015/223* (2013.01)

(56) References Cited

U.S. PATENT DOCUMENTS

| | | | |
|---|---|---|---|
| 10,276,149 B1* | 4/2019 | Liang | G10L 13/033 |
| 2017/0323636 A1* | 11/2017 | Xiao | G06F 16/332 |
| 2019/0188317 A1* | 6/2019 | Kashyap | G06N 5/022 |

* cited by examiner ofUSING BACKPROPAGATION TO TRAIN A DIALOG SYSTEM

CROSS-REFERENCE TO RELATED APPLICATIONS

The present disclosure claims priority to U.S. Provisional Application Ser. No. 62/898,680 for "Techniques for Using Backpropagation to Train a Dialog System," filed Sep. 11, 2019, which is incorporated by reference herein in its entirety.

TECHNICAL FIELD

The present disclosure relates to dialog systems and, more particularly, to techniques for using backpropagation to train machine learning models of a dialog system, for instance, where that training is based on actual predictions made by machine learning models in a workflow pipeline of the dialog system, such that the machine learning models learn to implicitly correct errors made within the dialog system.

BACKGROUND

An increasing number of devices now enable users to interact with the devices directly using voice or spoken speech. For example, a user can speak to such a device in a natural language, and in doing so, the user can ask a question or make a statement requesting an action to be performed. In response, the device performs the requested action or responds to the user's question using audio output. Since interacting directly using voice is a more natural and intuitive way for humans to communicate with their surroundings, the popularity of such speech-based systems is growing at an astronomical rate.

BRIEF SUMMARY

The present disclosure relates to techniques for using backpropagation (i.e., backward propagation of errors) to train one or more machine learning models of a dialog system. Specifically, such machine learning models, also referred to herein as models, may include one or more of a text-to-speech (TTS) subsystem, an automatic speech recognition (ASR) subsystem, and a semantic parser subsystem. As a result of such training, the models may be tuned work effectively within a pipeline of the dialog system.

A training system according to some embodiments utilizes seed data as a basis for training various models in the dialog system. In some embodiments, the seed data includes a set of tuples, each tuple including an original utterance and a corresponding original logical form that represents the original utterance. In some embodiments, the training system includes a conversion subsystem, which incorporates one or more models selected from the dialog system. The conversion subsystem performs a sequence of one, two, or more conversions. For each tuple in the seed data, the conversion subsystem of the training system converts the tuple to a converted tuple, and the training system may then compare the each converted tuple to the corresponding tuple from the seed data to determine how to update the machine learning models participating in the conversion subsystem so as to improve the accuracy of conversions.

Specifically, some embodiments of the conversion subsystem utilize, and thus include, a TTS subsystem, an ASR subsystem, and a semantic parser subsystem selected from a dialog system. The conversion subsystem may also utilize, and thus include, an inverse sequence-to-sequence (seq2seq) model that is the inverse of the semantic parser subsystem. For each tuple in the seed data, the conversion subsystem applies the inverse sequence-to-sequence (seq2seq) model to the original logical form of the tuple to cause the inverse seq2seq model to determine a second utterance. The conversion subsystem applies the TTS subsystem to the second utterance to cause the TTS subsystem to determine audio data. The conversion subsystem applies the ASR subsystem to the audio data to cause the ASR subsystem to determine a third utterance. The conversion subsystem applies the semantic parser subsystem to the third utterance to cause the semantic parser subsystem to determine a converted logical form.

In some embodiments, for each tuple of the training data, the training system applies an objective function to determine a degree of difference between the converted logical form and the original logical form from the tuple, which are ideally the same. The training system may use the result of the objective function to train the inverse seq2seq model, the TTS subsystem, the ASR subsystem, and the semantic parser subsystem by way of backpropagation. As a result, the TTS subsystem, the ASR subsystem, and the semantic parser subsystem may be tuned to work more effectively together within the dialog system.

The foregoing, together with other features and embodiments will become more apparent upon referring to the following specification, claims, and accompanying drawings.

DETAILED DESCRIPTION

Figure 1:
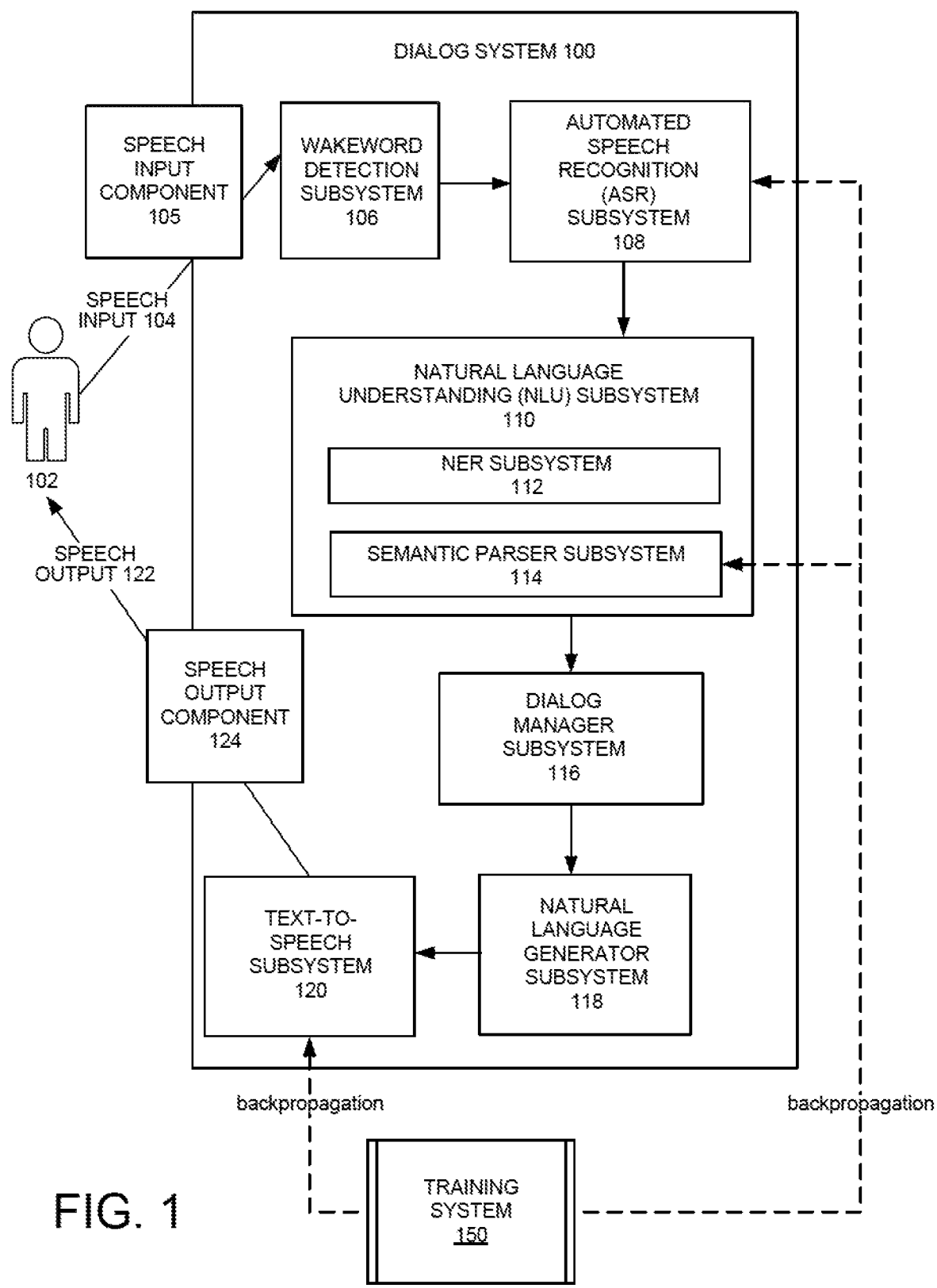
FIG. 1 is a diagram of an example of a dialog system 100 utilizing an automatic speech recognition subsystem, a semantic parser, and a text-to-speech subsystem trained by way of backpropagation, according to certain embodiments described herein.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" or as an "example" is not necessarily to be construed as preferred or advantageous over other embodiments or designs.

A voice-enabled system that is capable of having a dialog with a user via speech inputs and audio outputs, also referred to as voice outputs, can come in various forms. For example, such a system may be provided as a stand-alone device, as a digital or virtual assistant, as a voice-capable service, or the like. In each of these forms, the system is capable of receiving speech inputs, understanding the speech inputs, generating responses or taking actions responsive to the speech inputs, and outputting the responses using audio outputs. In certain embodiments, the dialog functionality in such a voice-enabled system is provided by a dialog system or infrastructure ("dialog system"). The dialog system is configured to receive speech inputs, interpret the speech inputs, maintain a dialog, possibly perform or cause one or more actions to be performed based on interpretations of the speech inputs, prepare appropriate responses, and output the responses to the user using audio output.

Conventionally, a dialog system includes various machine learning (ML) models, such as an automatic speech recognition (ASR) subsystem, a semantic parser subsystem, and a text-to-speech (TTS) subsystem. These ML models are typically trained with clean data, i.e., data that is not the output of a different component of the dialog system. As a result, the ML models learn to handle clean data, rather than data that has already been processed and likely has had errors introduced. For instance, if the ASR subsystem makes an error in translating speech input to text, then that error is passed along to the semantic parser in the form of an inaccurate utterance. The semantic parser subsystem then produces a logical form based on the inaccurate utterance. Analogously, if the semantic parser subsystem makes an error, that error is passed along to the dialog manager subsystem, which generates response text as a reply to the original speech input based on a propagation of errors throughout the pipeline of the dialog system. The TTS subsystem then generates speech output based on the response text and, thus, indirectly based on one or more errors in the dialog system. Such errors can dramatically diminish the user experience when a user seeks a dialog with the dialog system.

Embodiments described herein provide improved techniques for training one or more ML models of the dialog system. In some embodiments, a training system described herein utilizes backpropagation (i.e., backward propagation of errors) to train such ML models. For instance, a training system described herein utilizes a set of seed data including various training tuples, in which each training tuple includes a respective utterance and a corresponding logical form. The training system uses one or more ML models of a dialog system to convert a training tuple of the seed data to one or more other formats, such that the ML models together determine a converted training tuple. The converted training tuple is thus a representation of the training tuple after the application of ML models of the dialog system. Ideally, because the ML models translate data from one format to another (e.g., from an utterance to a logical form representing the utterance), the converted training tuple should match the training tuple. For instance, if the ML models convert the logical form of the training tuple to an utterance, to audio data, to a second utterance, and then to a second logical form, the second logical form should ideally be the same as the logical form from the seed data. In some embodiments, the training system compares the converted training tuple to the training tuple, and the training system uses an error between the converted training tuple and the training tuple as a training signal with which to train the ML models used in the conversion via backpropagation.

Thus, through backpropagation, each ML model trained as described herein may be tuned to work with other ML models of the dialog system. The result is a dialog system with ML models that are tuned based on errors expected within the pipeline of the dialog system, so as to reduce such errors over the entire pipeline of the dialog system during operation.

FIG. 1 is a diagram of an example of a dialog system 100 utilizing an ASR subsystem 108, a semantic parser 114, and a TTS subsystem 120 trained by way of backpropagation, according to certain embodiments described herein. The dialog system 100 is configured to receive speech inputs 104, also referred to as voice inputs, from a user 102. The dialog system 100 may then interpret the speech inputs 104. The dialog system 100 may maintain a dialog with a user 102 and may possibly perform or cause one or more actions to be performed based upon interpretations of the speech inputs 104. The dialog system 100 may prepare appropriate responses and may output the responses to the user using voice or speech output, also referred to as audio output. The dialog system 100 is a specialized computing system that may be used for processing large amounts of data potentially using a large number of computer processing cycles. The numbers of devices depicted in FIG. 1 are provided for illustrative purposes. Different numbers of devices may be used. For example, while each device, server, and system in FIG. 1 is shown as a single device, multiple devices may be used instead.

In certain embodiments, the processing performed by the dialog system 100 is implemented by a pipeline of components or subsystems, including a speech input component 105; a wake-word detection (WD) subsystem 106; an ASR subsystem 108, also referred to as an ASR 108; a natural language understanding (NLU) subsystem 110, which includes a named entity recognizer (NER) subsystem 112 and a semantic parser subsystem 114; a dialog manager (DM) subsystem 116; a natural language generator (NLG) subsystem 118; a TTS subsystem 120; and a speech output component 124. The subsystems listed above may be implemented only in software (e.g., using code, a program, or instructions executable by one or more processors or cores), in hardware, or in a combination of hardware and software. In certain implementations, one or more of the subsystems may be combined into a single subsystem. Additionally or alternatively, in some implementations, the functions described herein as performed by a particular subsystem may be implemented by multiple subsystems.

The speech input component 105 includes hardware and software configured to receive speech input 104. In some instances, the speech input component 105 may be part of the dialog system 100. In some other instances, the speech input component 105 may be separate from and be communicatively coupled to the dialog system 100. The speech input component 105 may, for example, include a microphone coupled to software configured to digitize and transmit speech input 104 to the wake-word detection subsystem 106.

The wake-word detection (WD) subsystem 106 is configured to listen for and monitor a stream of audio input for input corresponding to a special sound or word or set of words, referred to as a wake-word. Upon detecting the wake-word for the dialog system 100, the WD subsystem 106 is configured to activate the ASR subsystem 108. In certain implementations, a user may be provided the ability to activate or deactivate the WD subsystem 106 (e.g., by pushing a button) to cause the WD subsystem 106 to listen for or stop listening for the wake-word. When activated, or when operating in active mode, the WD subsystem 106 is configured to continuously receive an audio input stream and process the audio input stream to identify audio input, such as speech input 104, corresponding to the wake-word. When audio input corresponding to the wake-word is detected, the WD subsystem 106 activates the ASR subsystem 108.

As described above, the WD subsystem 106 activates the ASR subsystem 108. In some implementations of the dialog system 100, mechanisms other than wake-word detection may be used to trigger or activate the ASR subsystem 108. For example, in some implementations, a push button on a device may be used to trigger the ASR subsystem 108 without needing a wake-word. In such implementations, the WD subsystem 106 need not be provided. When the push button is pressed or activated, the speech input 104 received after the button activation is provided to the ASR subsystem 108 for processing. Additionally or alternatively, in some implementations, the ASR subsystem 108 may be activated upon receiving an input to be processed.

The ASR subsystem 108 is configured to receive and monitor speech input 104 after a trigger or wake-up signal (e.g., a wake-up signal may be sent by the WD subsystem 106 upon the detection of the wake-word in the speech input 104, or the wake-up signal may be received upon the activation of a button) and to convert the speech input 104 to text. As part of its processing, the ASR subsystem 108 performs speech-to-text conversion. The speech input 104 may be in a natural language form, and the ASR subsystem 108 is configured to generate the corresponding natural language text in the language of the speech input 104. This corresponding natural language text is referred to herein as an utterance. For instance, the speech input 104 received by the ASR subsystem 108 may include one or more words, phrases, clauses, sentences, questions, or the like. The ASR subsystem 108 is configured to generate an utterance for each spoken clause and feed the utterances to the NLU subsystem 110 for further processing.

The NLU subsystem 110 receives utterances generated by the ASR subsystem 108. The utterances received by the NLU subsystem 110 from the ASR subsystem 108 may include text utterances corresponding to spoken words, phrases, clauses, or the like. The NLU subsystem 110 translates each utterance, or a series of utterances, to a corresponding logical form.

In certain implementations, the NLU subsystem 110 includes a named entity recognizer (NER) subsystem 112 and a semantic parser subsystem 114. The NER subsystem 112 receives an utterance as input, identifies named entities in the utterance, and tags the utterance with information related to the identified named entities. The tagged utterances are then fed to the semantic parser subsystem 114, which is configured to generate a logical form for each tagged utterance, or for a series of tagged utterances. The logical form generated for an utterance may identify one or more intents corresponding to the utterance. An intent for an utterance identifies an objective of the utterance. Examples of intents include "order pizza" and "find directions." An intent may, for example, identify an action that is requested to be performed. In addition to intents, a logical form generated for an utterance may also identify slots, also referred to as parameters or arguments, for an identified intent. For example, for the speech input "I'd like to order a large pepperoni pizza with mushrooms and olives," the NLU subsystem 110 can identify the intent order pizza. The NLU subsystem can also identify and fill slots, e.g., pizza_size (filled with large) and pizza_toppings (filled with mushrooms and olives). The NLU subsystem 110 may use machine learning based techniques, rules, which may be domain specific, or a combination of machine learning techniques and rules to generate the logical forms. The logical forms generated by the NLU subsystem 110 are then fed to the DM subsystem 116 for further processing.

As shown in FIG. 1, in some embodiments, a training system 150 described herein trains one or more ML models of the dialog system 100, such as the ASR subsystem 108, the semantic parser subsystem 114, and the TTS subsystem 200. In some embodiments, as described in detail below, the training system 150 incorporates the one or more ML models into a conversion subsystem, which converts seed data into converted seed data. The training system 150 determines an error between the converted seed data and the seed data, and the training system 150 utilizes that error to train the one or more ML models via backpropagation. As a result, the one or more ML models are tuned to work together to reduce the propagation of errors through the dialog system 100.

The DM subsystem 116 is configured to manage a dialog with the user based on logical forms received from the NLU subsystem 110. As part of the dialog management, the DM subsystem 116 is configured to track dialog states, initiate the execution of or itself execute one of more actions or tasks, and determine how to interact with the user. These actions may include, for example, querying one or more databases, producing execution results, or other actions. For example, the DM subsystem 116 is configured to interpret the intents identified in the logical forms received from the NLU subsystem 110. Based on the interpretations, the DM subsystem 116 may initiate one or more actions that it interprets as being requested by the speech inputs 104 provided by the user. In certain embodiments, the DM subsystem 116 performs dialog-state tracking based on current and past speech inputs 104 and based on a set of rules (e.g., dialog policies) configured for the DM subsystem 116. These rules may specify the different dialog states, conditions for transitions between states, actions to be performed when in a particular state, or the like. These rules may be domain specific. The DM subsystem 116 also generates responses to be communicated back to the user involved in the dialog. These responses may be based upon actions initiated by the DM subsystem 116 and their results. The responses generated by the DM subsystem 116 are fed to the NLG subsystem 118 for further processing.

The NLG subsystem 118 is configured to generate natural language texts corresponding to the responses generated by the DM subsystem 116. The texts may be generated in a form that enables them to be converted to speech by the TTS subsystem 120. The TTS subsystem 120 receives the texts from the NLG subsystem 118 and converts each of them to speech or voice audio, which may then be output as audio to the user via an audio or speech output component 124 of the dialog system (e.g., a speaker, or communication channel coupled to an external speaker). In some instances, the speech output component 124 may be part of the dialog system 100. In some other instances, the speech output component 124 may be separate from and communicatively coupled to the dialog system 100.

As described above, the various subsystems of the dialog system 100 working in cooperation provide the functionality that enables the dialog system 100 to receive speech inputs 104 and to respond using speech outputs 122 and, thereby, to maintain a dialog with a user using natural language speech. The various subsystems described above may be implemented using a single computer system or using multiple computer systems working cooperatively. For example, for a device implementing the voice-enabled system, the subsystems of the dialog system 100 described above may be implemented entirely on the device with which the user interacts. In some other implementations, some components or subsystems of the dialog system 100 may be implemented on the device with which the user interacts, while other components may be implemented remotely from the device, possibly on some other computing devices, platforms, or servers.

Figure 2:
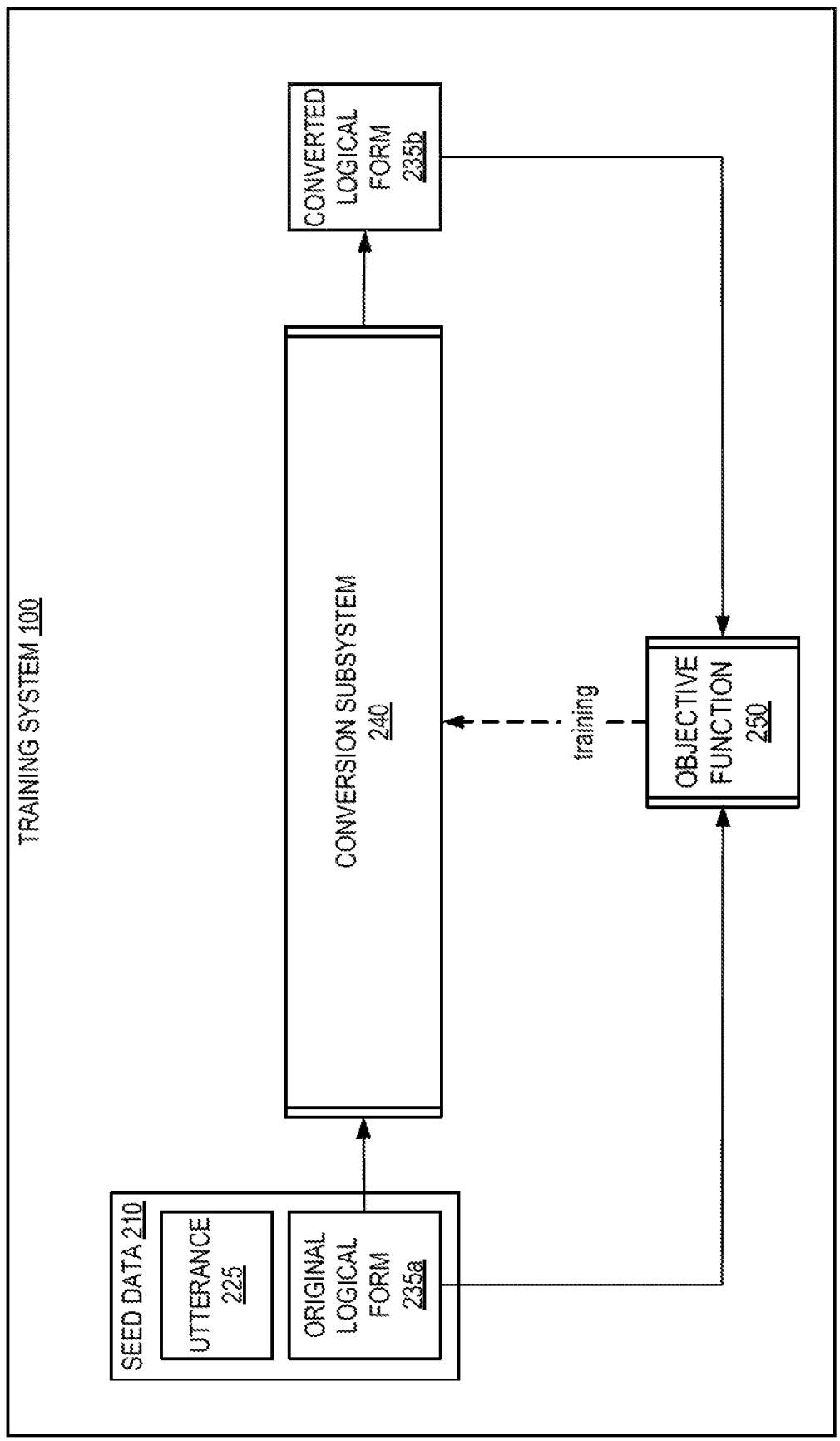
FIG. 2 is a diagram of an example of a training system for training one or more machine learning models of the dialog system, according to certain embodiments described herein.

FIG. 2 is a diagram of an example of the training system 150, which is configured to train one or more ML models of a dialog system 100, according to certain embodiments described herein. In some embodiments, the training system 150 is implemented as a computing device or portion thereof, such as a server. The training system 150 may be implemented as hardware, software, or a combination of both. For instance, the training system 150 may be a specialized hardware device or program code, or a combination of both. For instance, the operations described herein as being performed by the training system 150 may be embodied in program code implementing the training system 150, where such program code is executable by one or more processing units.

As described above, the dialog system 100 includes various ML models in its pipeline, or workflow. More specifically, these models may include an ASR 108, a semantic parser subsystem 114, and a TTS subsystem 120, potentially in addition to others. As shown in FIG. 2, the training system 150 may be configured to train one or more of such ML models that are selected from the dialog system 100 and incorporated into a conversion subsystem 240 of the training system 150.

As described above, various ML models of the dialog system 100 are configured to translate, or convert, data from one format to another. For instance, a user provides speech input 104 to the dialog system 100, such as by speaking. In some embodiments of the dialog system 100, the ASR 108 translates the speech input 104 into an utterance 225, which the semantic parser subsystem 114 translates into a logical form 235, which the dialog manager subsystem 116 processes to determine a response, which the TTS subsystem 120 translates into speech output 122 responsive to the speech input 104. By the conversion subsystem 240 of the training system 150, seed data 210 is translated one or more times using one or more of these ML models. The training system 150 may compare the result of such translations, as performed by the conversion subsystem 240, to the original seed data 210 to train the ML models that participate in the conversion subsystem 240.

As shown in FIG. 2, the training system 150 may have access to a set of seed data 210, also referred to as training data, which may include a set of tuples. Each tuple in the seed data 210 may include an utterance 225 and a corresponding logical form 235 (i.e., an expression of the utterance in the language of logical forms). Generally, the logical form 235 in a given tuple may be a structured translation of the corresponding utterance 225 in that given tuple. The seed data 210 may be appropriate for training the semantic parser subsystem 114; during operation of the dialog system 100, the semantic parser subsystem 114, also referred to as the semantic parser 114, takes an utterance 225 as input and determines a logical form 235. However, in some embodiments, the seed data 210 need not, but can, be used to directly train the semantic parser 114.

The conversion subsystem 240 may include one or more of the ML models of the dialog system 100, and the training system 150 may be enabled to train each of such ML models to enable those ML models to operate more effectively in the dialog system 100. For instance, as described below in detail, the conversion subsystem 240 may include the ASR 108, the semantic parser 114, and the TTS subsystem 120 of a dialog system 100, and in that case, the training system 150 may train each of the ASR 108, the semantic parser 114, and the TTS subsystem 120 as described herein.

In the conversion subsystem 240, one or more ML models of a dialog system 100 translate the seed data 210 into a converted version of the seed data 210, and the training system 150 utilizes an objective function 250 to compare the converted version to the original seed data 210. More specifically, in some embodiments, the conversion subsystem 240 takes as input an original logical form 235a from the seed data 210 and generates a converted logical form 235b by translating the original logical form 235a to one or more different formats (e.g., an utterance 225 or speech) and then back to the a logical form 235. The translations may be performed by one or more ML models of the dialog system 100. As such, the converted logical form 235b represents the original logical form 235a potentially with errors introduced through processing by the ML models in the dialog system 100. The conversion subsystem 240 may operate on each original logical form 235a in the seed data 210, thus enabling the training system 150 to train the ML models in the conversion subsystem 240 based on the resulting converted logical forms 235b.

Ideally, because the converted logical form 235b is a translation, each converted logical form 235b should be the same as the corresponding original logical form 235a from the seed data 210. However, this may not be the case due to the introduction of errors by the ML models in the conversion subsystem 240. In some embodiments, the training system 150 utilizes a difference between the original logical form 235a and the converted logical form 235b to train the ML models to behave better in the context of the pipeline of the dialog system 100. Specifically, the training system 150 may apply an objective function 250 (i.e., a loss function) to each converted logical form 235b and its corresponding original logical form 235a to determine a training value. Together, a stream or set of training values, determined based on performing the above operations for the various original logical forms 235a from the seed data 210, form a training signal. In some embodiments, the training system 150 utilizes the training signal to train the ML models participating in the conversion subsystem 240.

Figure 3:
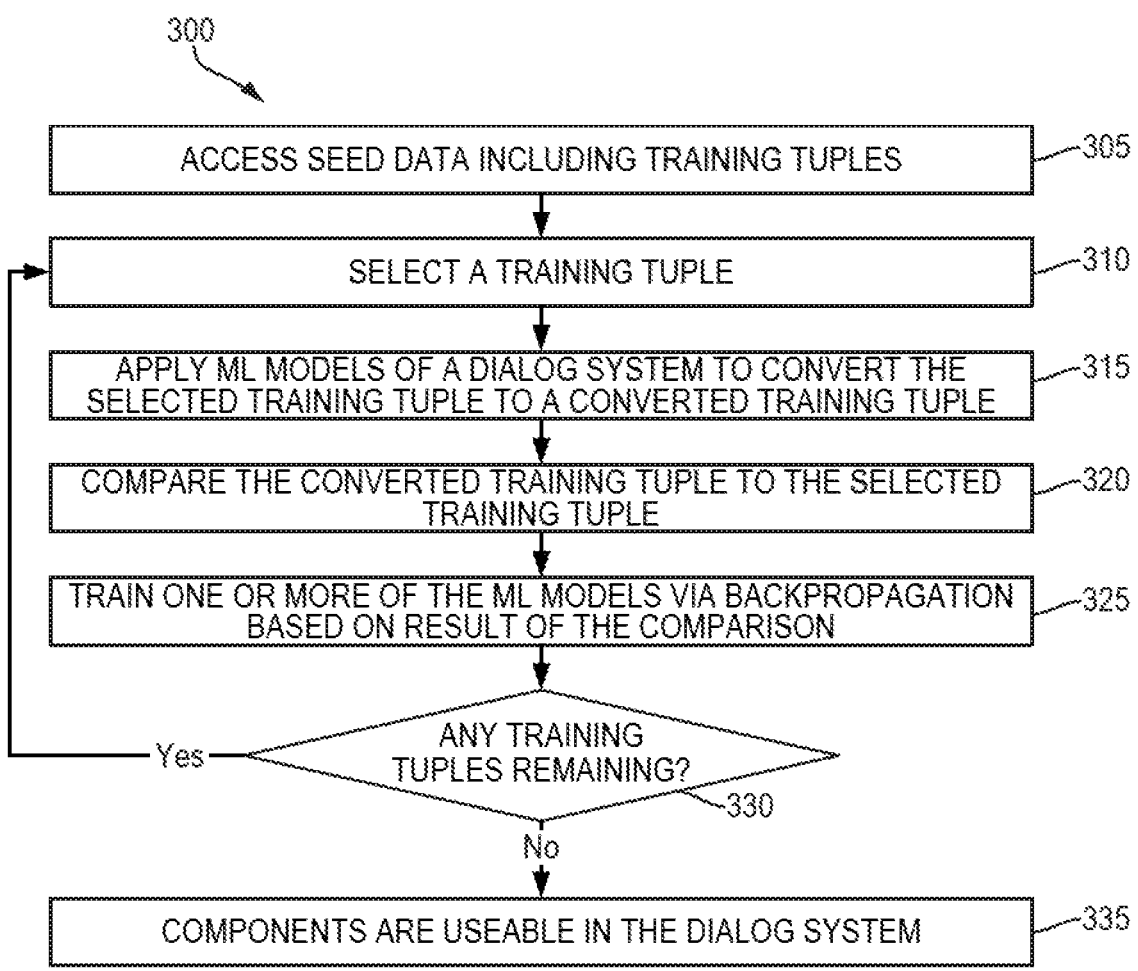
FIG. 3 is a diagram of an example of a method of using backpropagation to train one or more machine learning models of the dialog system, according to certain embodiments described herein.

FIG. 3 is a flow diagram of a method 300 of using backpropagation to train one or more ML models of a dialog system 100, according to certain embodiments. In some embodiments, prior to execution of this method 300, each ML model to be used by the conversion subsystem 240 of the training system 150 may have been, but need not have been, trained individually for use in the dialog system 100. For example, if the conversion subsystem 240 includes a TTS subsystem 120, then the TTS subsystem 120 has been trained to map utterances 225 to audio data 455, such as through the use of training data that includes utterances 225 and their corresponding audio data 455; if the conversion subsystem 240 includes an ASR 108, then the ASR 108 has been trained to map speech input 104 to utterances 225, such as through the use of training data that includes audio data 455 (e.g., speech input 104) and corresponding utterances 225; and if the conversion subsystem 240 includes a semantic parser 114, then the semantic parser 114 has been trained to map utterances 225 to logical forms, such as through the use of training data that includes utterances 225 and corresponding logical forms 235. Alternatively, training via backpropagation as performed by the training system 150 described herein may be used in lieu of training each model individually.

The method 300 depicted in FIG. 3, as well as other methods described herein, may be implemented in software (e.g., as code, instructions, or programs) executed by one or more processing units (e.g., processors or processor cores), in hardware, or in combinations thereof. The software may be stored on a non-transitory storage medium, such as on a memory device. This method 300 is intended to be illustrative and non-limiting. Although FIG. 3 depicts various activities occurring in a particular sequence or order, this is not intended to be limiting. In certain embodiments, for instance, the activities may be performed in a different order, or one or more activities of the method 300 may be performed in parallel. In certain embodiments, the method 300 may be performed by the training system 150.

As shown in FIG. 3, at block 305, the training system 150 accesses seed data 210 for use in the training system 150. The seed data 210 may include a set of tuples, each tuple including an original utterance 225 as well as an original logical form 235a corresponding to the original utterance 225. It will be understood that various techniques may be used to collect the seed data 210, and such techniques may be manual, automatic, or a combination of both.

In some embodiments, the collection of the seed data 210 may be, at least in part, a manual process. For instance, the seed data 210 may be crowdsourced. In some embodiments, a team of one or more individuals manually writes a grammar to describe a structure of the logical form 235. The team may generate a set of original logical forms 235a to be included in the seed data 210 and may provide such original logical forms 235a to one or more individuals in a crowd, asking the crowd to convert each original logical form 235a into a corresponding original utterance 225. Further, the team may provide an intermediate form to represent each such original logical form 235a, where the intermediate form is an abrupt or choppy variation of natural language that is relatively simply to produce by the team and relatively simple to understand by the crowd. The intermediate form may assist the crowd in conversion because use of the intermediate form means the crowd need not learn the language of logical forms 235. Thus, to convert an original logical form into natural language (i.e., a corresponding original utterance 225), the crowd may convert the corresponding intermediate form into natural language. It will be understood that multiple utterances 225 can equate to a common logical form 235, and thus, the crowd may generate one or more original utterances 225 based on an original logical form 235a, and each such original utterance 225 may be combined in a respective tuple with the original logical form 235a.

In another embodiment, a set of original utterances 225 are provided, and one or more individuals determine a logical form 235 for each such original utterance 225. However, it may provide more efficient to start with a logical form 235 because individuals are likely more familiar with natural language and may thus make faster work of generating utterances 225 in natural language as compared to generating logical forms 235 in a less familiar language.

Block 310 beings an iterative loop in which each tuple of the seed data 210 is considered in turn. The training system 150 may iterate over the tuples in the seed data 210. With each iteration, one or more ML models of the dialog system 100 that are included in the conversion subsystem 240 may be further tuned to provide accurate output. As described above and described further below, for each tuple of the seed data 210, an embodiment of the training system 150 utilizes the conversion subsystem 240 to translate the tuple to a converted tuple. For instance, this may include converting the utterance 225 of the tuple to a converted utterance 225 or converting the original logical form 235a of the tuple to a converted logical form 235b, as in the example of FIG. 2. The training system 150 then compares the converted tuple to the original tuple to train the ML models in the conversion subsystem 240. Specifically, at block 310, the training system 150 selects from the seed data 210 a tuple that has not yet been considered so as to perform these activities.

At block 315, the conversion subsystem 240 of the training system 150 applies the one or more ML models of the conversion subsystem 240 to the selected tuple, which was selected to block 310, to translate the selected tuple to a converted tuple. As described above, each ML model used by the conversion subsystem 240 may perform a type of translation. Thus, ideally, the converted tuple is equal to the selected tuple.

At block 320, the training system 150 compares the converted tuple, determined at block 315, to the selected tuple, determined at block 310. For instance, the training system 150 may apply an objective function 250 to perform this comparison. In some embodiments, utilizing the objective function 250 or another technique, the training system 150 determines a degree of error between the converted tuple and the selected tuple, where the selected tuple is the desired result of the conversions performed by the conversion subsystem 240.

At block 325, the training system 150 trains the ML models used by the conversion subsystem 240, or a subset of these ML models, using backpropagation based on the result of the comparison performed at block 320. For instance, for an ML model implemented as a neural network, the training system 150 updates the weights of the nodes of such ML model based on the degree of error determined above.

At decision block 330, the training system 150 determines whether any tuples remain for consideration in the seed data 210. If one or more tuples have not yet been considered, then the method 300 returns to block 310 to select another tuple. However, if all such tuples have been considered, then the method 300 ends at block 335, with the ML models of the dialog system 100 having been trained and being useable in the dialog system 100.

Figure 4:
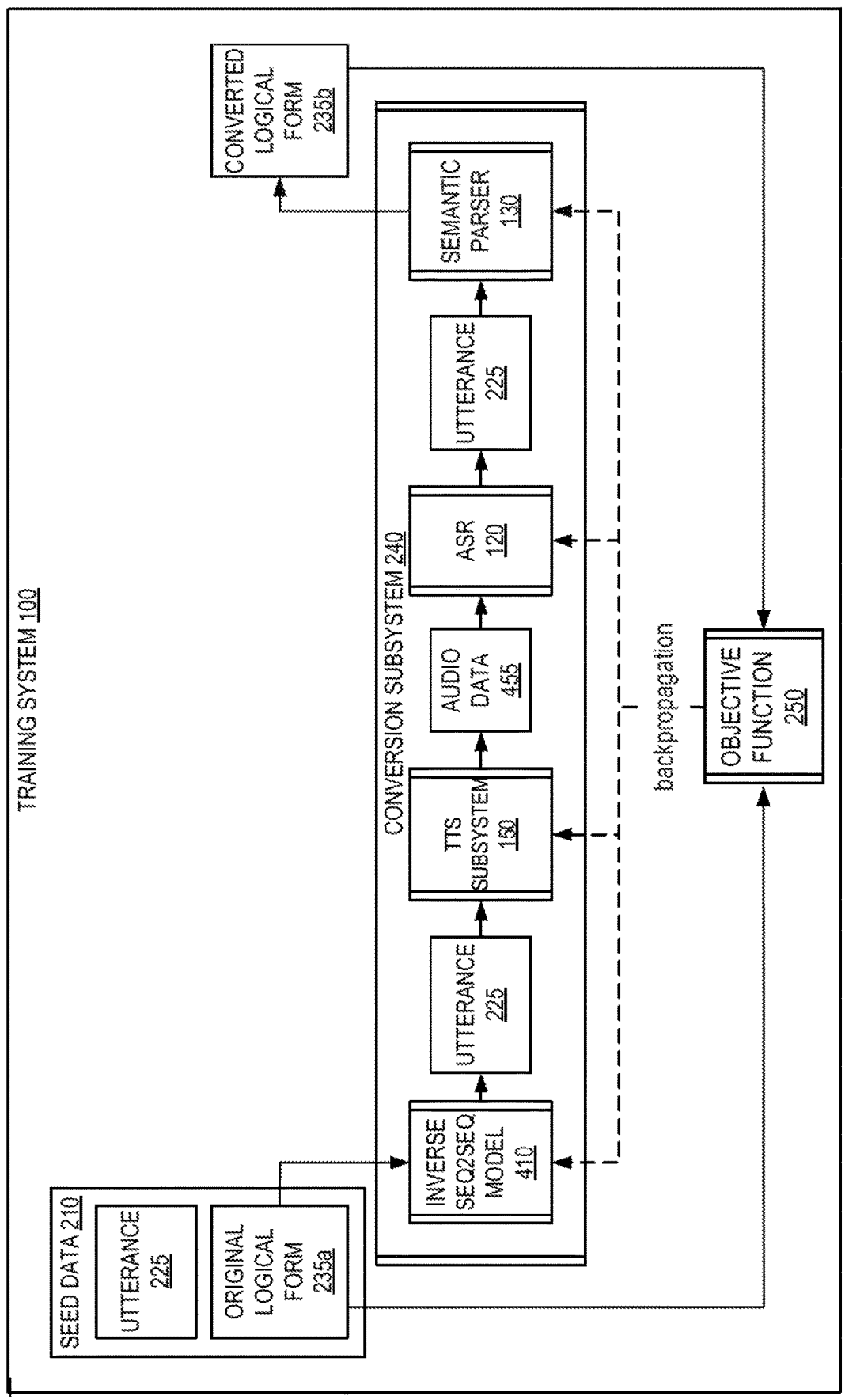
FIG. 4 is a diagram of another example of the training system for training one or more machine learning models of the dialog system, according to certain embodiments described herein.

FIG. 4 is a diagram of another example of a training system 150 configured to train one or more ML models of a dialog system 100, according to certain embodiments. In some embodiments, the training system 150 is implemented as a computing device or portion thereof, such as a server. The training system 150 may be implemented as a specialized hardware device or as program code, or a combination of both. For instance, the operations described herein as being performed by the training system 150 may be embodied in program code implementing the training system 150, where such program code is executable by one or more processing units.

As described above, the conversion subsystem 240 of the training system 150 includes one or more ML models selected from the dialog system 100, thus enabling the training system 150 to train those ML models using a training signal based on comparing their output (i.e., a converted logical form 235b) to expected output (i.e., an original logical form 235a from the seed data 210). The conversion subsystem 240 applies each such ML model to tuples of seed data 210, as described further below, to determine the training signal. Specifically, in the example of FIG. 4, the conversion subsystem 240 includes the ASR 108, the semantic parser 114, and the TTS subsystem 120 of a dialog system 100. In some embodiments, the ASR 108, the semantic parser 114, and the TTS subsystem 120 may be selected from a single dialog system 100 that utilizes this specific ASR 108, semantic parser 114, and TTS subsystem 120. The training described herein performed by the training system 150 may be in addition to conventional training, in which each such ML model participating in the conversion subsystem 240 may be trained on an individual basis, or in lieu of conventional training.

As shown in FIG. 4, the training system 150 may have access to a set of seed data 210, which may include a set of tuples, each tuple including an utterance 225 and a corresponding original logical form 235a. Logical forms 235, such as the original logical form 235a, may be syntactical expressions complying with a predefined grammar that is parseable by a dialog manager subsystem 116 of the dialog system 100. Thus, the original logical form 235a in a tuple may be a structured translation of the corresponding utterance 225 in the tuple. The seed data 210 may be appropriate for training the semantic parser 114, which, during operation of the dialog system 100, takes an utterance 225 as input and determines a logical form 235. However, in some embodiments, the seed data 210 need not, but can, be used to directly train the semantic parser 114. As described below, the conversion subsystem 240 may apply the one or more ML models participating in the conversion subsystem 240 to tuples of the seed data 210 to convert those tuples in order to determine a training signal.

In some embodiments, as in this example, the conversion subsystem 240 of the training system 150 may apply an inverse seq2seq model 410 to the original logical form 235a of each tuple in the seed data 210 to cause the inverse seq2seq model 410 to determine a second utterance 225 corresponding to the original logical form 235a. The second utterance 225 may thus be a translation of the logical form 235 selected from the tuple of the seed data 210. In some embodiments, the inverse seq2seq model 410 is trained in parallel with the semantic parser 114, as described herein, to be the inverse of the semantic parser 114, which may be a seq2seq model. For instance, the semantic parser 114 inputs utterances 225 and outputs logical forms 235, whereas the inverse seq2seq model 410 inputs logical forms 235 and thus outputs utterances 225. More specifically, as trained herein, when provided with a logical form 235 output by the semantic parser 114 based on a specific utterance 225, the inverse seq2seq model 410 would output that same specific utterance 225. The second utterance 225 may be a textual translation of the original logical form 235a but may include errors based on the potential inaccuracy in the inverse seq2seq model 410 and, as such, based on the potential inaccuracy in the semantic parser 114.

In some embodiments, the conversion subsystem 240 of the training system 150 applies the TTS subsystem 120 to the second utterance 225, as determined by the inverse seq2seq model 410, to cause the TTS subsystem 120 to determine audio data 455 corresponding to the second utterance 225 and thus to the original logical form 235a. The audio data 455 may thus be an audio translation of the original logical form 235a; however, the audio data 455 may incorporate errors introduced by the inverse seq2seq model 410 or the TTS subsystem 120. These would be the same types of errors as would be introduced during operation of the dialog system 100 because the TTS subsystem 120 is part of the dialog system 100 and because the inverse seq2seq model 410 is a representation of the semantic parser 114, which is also part of the dialog system 100.

In some embodiments, the conversion subsystem of the training system 150 applies the ASR 108 to the audio data 455 to cause the ASR 108 determine a third utterance 225, which corresponds to the audio data 455, the second utterance 225, and the original logical form 235a. The third utterance 225 may thus be a textual translation of the original logical form 235a; however, the third utterance 225 may incorporate errors introduced by the inverse seq2seq model 410, the TTS subsystem 120, or the ASR 108. These would be the same types of errors as would be introduced during operation of the dialog system 100 because the TTS subsystem 120 and the ASR 108 are part of the dialog system 100 and because the inverse seq2seq model 410 is a representation of the semantic parser 114, which is also part of the dialog system 100.

In some embodiments, the conversion subsystem 240 of the training system 150 applies the semantic parser 114 to the third utterance 225 to cause the semantic parser 114 to determine the converted logical form 235b. The converted logical form 235b may thus be a translation of the original logical form 235a; however, the converted logical form 235b may incorporate errors introduced by the inverse seq2seq model 410, the TTS subsystem 120, the ASR 108, or the semantic parser 114. These would be the same types of errors as would be introduced during operation of the dialog system 100 because the TTS subsystem 120, the ASR 108, and the semantic parser 114 are part of the dialog system 100 and because the inverse seq2seq model 410 is a representation of the semantic parser 114, which is part of the dialog system 100.

Ideally, because each of the inverse seq2seq model 410, the TTS subsystem 120, the ASR 108, and the semantic parser 114 is an ML model learning to translate data from one form into another form, a converted logical form 235b should be the same as the corresponding original logical form 235a selected from the seed data 210. However, this may not be the case due to the introduction of errors by the inverse seq2seq model 410, the TTS subsystem 120, the ASR 108, and the semantic parser 114. In some embodiments, the training system 150 utilizes a difference between the converted logical form 235b and the corresponding original logical form 235a to train the TTS subsystem 120, the ASR 108, and the semantic parser 114 to behave better in the context of the pipeline of the dialog system 100. In other words, the training system 150 may teach the TTS subsystem 120, the ASR 108, and the semantic parser 114 to generate a more accurate converted logical form 235b, thus tuning the TTS subsystem 120, the ASR 108, and the semantic parser 114 to operate together with a reduction in errors.

To train the TTS subsystem 120, the ASR 108, and the semantic parser, the training system 150 may apply an objective function 250 (i.e., a loss function) to the converted logical form 235b and the corresponding original logical form 235a to determine a training value. Together, a stream or set of training values determined based on the various original logical forms 235a in the seed data 210 form a training signal. In some embodiments, the training system 150 utilizes the training signal to train one or more of (e.g., each of) the inverse seq2seq model 410, the TTS subsystem 120, the ASR 108, and the semantic parser 114. As a result, the TTS subsystem 120, the ASR 108, and the semantic parser 114 learn to operate within the pipeline of the dialog system 100 and may thus more effectively work together.

Figure 5:
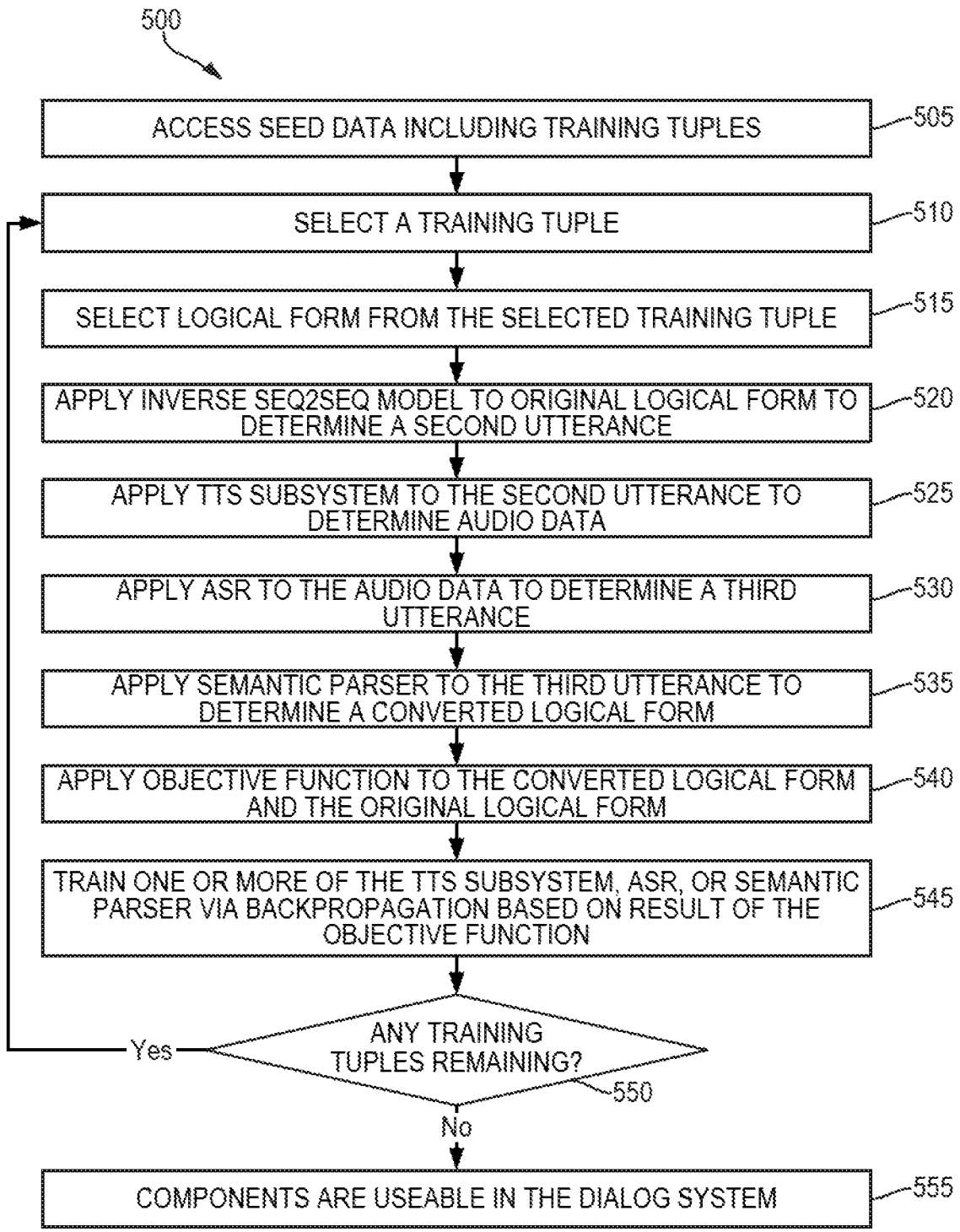
FIG. 5 is a diagram of another example of a method of using backpropagation to train one or more machine learning models of the dialog system, according to certain embodiments described herein.

FIG. 5 is a diagram of another example of a method 500 of using backpropagation to train one or more ML models of a dialog system 100, according to certain embodiments. Specifically, in this example, the conversion subsystem 240 applies the ASR 108, the semantic parser 114, and the TTS subsystem 120, and the training system 150 trains the ASR 108, the semantic parser 114, and the TTS subsystem 120 using backpropagation.

In some embodiments, prior to execution of this method 500, each of these ML models may have been, but need not have been, trained individually. For instance, given the conversion subsystem 240 in the example of FIG. 4, the inverse seq2seq model 410 has been trained individually to map logical forms 235 to utterances 225, such as through the use of training data that includes logical forms 235 and their corresponding utterances 225, where the logical forms 235 are used as training input and the corresponding utterances are the expected output for training; the TTS subsystem 120 has been trained to map utterances 225 to audio data 455, such as through the use of training data that includes utterances 225 and their corresponding audio data 455; the ASR 108 has been trained to map speech input 104 to utterances 225, such as through the use of training data that includes audio data 455 (e.g., speech input 104) and corresponding utterances 225; and the semantic parser 114 has been trained to map utterances 225 to logical forms, such as through the use of the same training data used to train the inverse seq2seq model 410 but with the utterances 225 as training input and the logical forms 235 as the expected output for training. Alternatively, training via backpropagation as performed by the training system 150 described herein may be used in lieu of training each model individually.

The method 500 depicted in FIG. 5, as well as other methods described herein, may be implemented in software (e.g., as code, instructions, or programs) executed by one or more processing units (e.g., processors or processor cores), in hardware, or in combinations thereof. The software may be stored on a non-transitory storage medium, such as on a memory device. This method 500 is intended to be illustrative and non-limiting. Although FIG. 5 depicts various activities occurring in a particular sequence or order, this is not intended to be limiting. In certain embodiments, for instance, the activities may be performed in a different order, or one or more activities of the method 500 may be performed in parallel. In certain embodiments, the method 500 may be performed by the training system 150.

As shown in FIG. 5, at block 505, the training system 150 accesses seed data 210 for use in the training system 150. The seed data 210 may include a set of tuples, each tuple including an original utterance 225 as well as an original logical form 235a corresponding to the original utterance 225. It will be understood that various techniques may be used to collect the seed data 210, and such techniques may be manual, automatic, or a combination of both.

In some embodiments, the collection of the seed data 210 may be, at least in part, a manual process. For instance, the seed data 210 may be crowdsourced. In some embodiments, a team of one or more individuals manually writes a grammar to describe a structure of the logical form 235. The team may generate a set of original logical forms 235a to be included in the seed data 210 and may provide such original logical forms 235a to one or more individuals in a crowd, asking the crowd to convert each original logical form 235a into a corresponding original utterance 225. Further, the team may provide an intermediate form to represent each such original logical form 235a, where the intermediate form is an abrupt or choppy variation of natural language that is relatively simply to produce by the team and relatively simple to understand by the crowd. The intermediate form may assist the crowd in conversion because use of the intermediate form means the crowd need not learn the language of logical forms 235. Thus, to convert an original logical form into natural language (i.e., a corresponding original utterance 225), the crowd may convert the corresponding intermediate form into natural language. It will be understood that multiple utterances 225 can equate to a common logical form 235, and thus, the crowd may generate one or more original utterances 225 based on an original logical form 235a, and each such original utterance 225 may be combined in a respective tuple with the original logical form 235a.

In another embodiment, a set of original utterances 225 are provided, and one or more individuals determine a logical form 235 for each such original utterance 225. However, it may provide more efficient to start with a logical form 235 because individuals are likely more familiar with natural language and may thus make faster work of generating utterances 225 in natural language as compared to generating logical forms 235 in a less familiar language.

Block 510 beings an iterative loop in which each tuple of the seed data 210 is considered in turn. The training system 150 may iterate over the tuples in the seed data 210. With each iteration, one or more ML models of the dialog system 100 may be further tuned to provide accurate output. As described above and described further below, for each tuple of the seed data 210, an embodiment of the training system 150 utilizes the conversion subsystem 240 to translate the tuple, specifically the original logical form 235a of the tuple, to a converted tuple, specifically to a converted logical form 235b. The training system 150 then compares the converted tuple to the original tuple to train the ML models in the conversion subsystem 240. Specifically, at block 510, the training system 150 selects from the seed data 210 a tuple that has not yet been considered so as to perform these activities.

At block 515, from the selected tuple, the training system 150 selects the original logical form 235a. As described above, each tuple may include an original logical form 235a and corresponding utterance 225, and the training system 150 may select the original logical form 235a from among those.

At block 520, the training system 150 applies the inverse seq2seq model 410 to the original logical form 235a to cause the inverse seq2seq model to determine a second utterance 225. Ideally, the second utterance 225 is the same as the original utterance 225 corresponding to the original logical form 235a in the seed data 210. However, this may not be the case due potentially to errors in predictions. In the early iterations of the loop, the inverse seq2seq model 410 may perform poorly, for instance, outputting a random utterance 225 (e.g., a random arrangement of words or letters) in the first iteration. In some embodiments, the inverse seq2seq model 410 improves as training proceeds over numerous iterations.

At block 525, the training system 150 applies the TTS subsystem 120 to the second utterance 225 to cause the TTS subsystem 120 determine audio data 455. The audio data 455 may be embodied in a sound file, such as a .wav file, for instance. Ideally, the audio data 455 is a perfect translation of the second utterance 225 and thus of the original logical form 235a. However, this may not be the case due potentially to errors in predictions. In some embodiments, the TTS subsystem 120 may perform poorly in early iterations, for instance, outputting random audio (e.g., a random arrangement of sounds or words) in the first iteration. Further, the second utterance 225 received by the TTS subsystem 120 may incorporate an error introduced by the inverse seq2seq model 410, and in some embodiments, the TTS subsystem 120 bases its output on the output of the inverse seq2seq model 410. Thus, the output of the TTS subsystem 120 is impacted not only by its own history of learning, but also by the history of the inverse seq2seq model 410. In some embodiments, the inverse seq2seq model 410 and the TTS subsystem 120 improve as training proceeds over numerous iterations.

At block 530, the training system 150 applies the ASR 108 to the audio data 455 to cause the ASR 108 to determine a third utterance 225. Ideally, the third utterance 225 is the same as the original utterance 225 corresponding to the original logical form 235a in the seed data 210. However, this may not be the case due potentially to errors in predictions. In the early iterations of this method 500, the ASR 108 may perform poorly, for instance, outputting a random utterance 225 (e.g., a random arrangement of words or letters) in the first iteration. Further, the audio data 455 received by the ASR 108 may incorporate an error introduced by the inverse seq2seq model 410 or the TTS subsystem 120, and in some embodiments, the ASR 108 bases its output on the output of the TTS subsystem 120. Thus, the output of the ASR 108 is impacted not only by its own history of learning, but also by the histories of the inverse seq2seq model 410 and the TTS subsystem 120. In some embodiments, the inverse seq2seq model 410, the TTS subsystem 120, and the ASR 108 improve as training proceeds over numerous iterations.

At block 535, the training system 150 applies the semantic parser 114 to the third utterance 225 to cause the semantic parser 114 determine a converted logical form 235b. Ideally, the converted logical form 235b is the same as the original logical form 235a selected from the seed data 210. However, this may not be the case due potentially to errors in predictions. In the early iterations of this method 500, the ASR 108 may perform poorly, for instance, outputting a random logical form 235 (e.g., a random arrangement of words and symbols) in the first iteration. Further, the third utterance 225 received by the semantic parser 114 may incorporate an error introduced by the inverse seq2seq model 410, the TTS subsystem 120, or the ASR 108, and in some embodiments, the semantic parser 114 bases its output on the output of the ASR 108. Thus, the output of the semantic parser 114 is impacted not only by its own history of learning, but also by the histories of the inverse seq2seq model 410, the TTS subsystem 120, and the ASR 108. In some embodiments, the inverse seq2seq model 410, the TTS subsystem 120, the ASR 108, and the semantic parser 114 improve as training proceeds over numerous iterations.

At block 540, an objective function 250 is applied to the converted logical form 235b and the original logical form 235a that was selected from the selected tuple in the seed data 210. The objective function 250 may compare its inputs to calculate a degree of difference between such inputs, which are, in this case, the converted logical form 235b and the original logical form 235a. Various techniques exist for constructing an appropriate objective function 250 for the comparison of logical forms 235, and one or more of such techniques may be used to develop the objective function 250 used by the training system 150.

At block 545, the training system 150 trains the inverse seq2seq model 410, the TTS subsystem 120, the ASR 108, and the semantic parser 114, or a subset of these models, using backpropagation based on the result of the objective function 250. In some embodiments, for instance, the TTS subsystem 120 is implemented as a neural network, and the training system 150 updates the weights of the nodes of the TTS subsystem 120 based on the training signal. Additionally or alternatively, the ASR 108 is implemented as a neural network, and the training system 150 updates the weights of the nodes of the ASR 108 based on the training signal. Additionally or alternatively, the semantic parser 114 is implemented as a neural network, and the training system 150 updates the weights of the nodes of the semantic parser 114 based on the training signal.

At decision block 550, the training system 150 determines whether any tuples remain for consideration in the seed data 210. If one or more tuples have not yet been considered, then the method 500 returns to block 510 to select another tuple. However, if all such tuples have been considered, then the method 500 ends at block 555, with the ML models of the dialog system 100 having been trained and being useable in the dialog system 100.

In some embodiments, some of the operations of the method 500 described above can be skipped to provide backpropagation to a proper subset of the ML models selected from the dialog system 100 for inclusion in the conversion subsystem 240. For instance, from among the inverse seq2seq model 410, the TTS subsystem 120, the ASR 108, and the semantic parser 114 in the conversion subsystem 240, the training system 150 may train only the inverse seq2seq model 410 and the semantic parser 114 or only the TTS subsystem 120 and the ASR 108.

Further, the conversion subsystem 240 is not limited to the example of including the inverse seq2seq model 410, the TTS subsystem 120, the ASR 108, and the semantic parser 114. For another example, the conversion subsystem 240 may include only the TTS subsystem 120 and the ASR 108, in which case the training system 150 may utilize the conversion subsystem 240 to convert the original utterance 225 to audio data 455 and then to a converted utterance 225, such that a comparison between original utterances 225 and corresponding converted utterances is used to train one or both of the TTS subsystem 120 and the ASR. Various implementations are within the scope of this disclosure.

Figure 6:
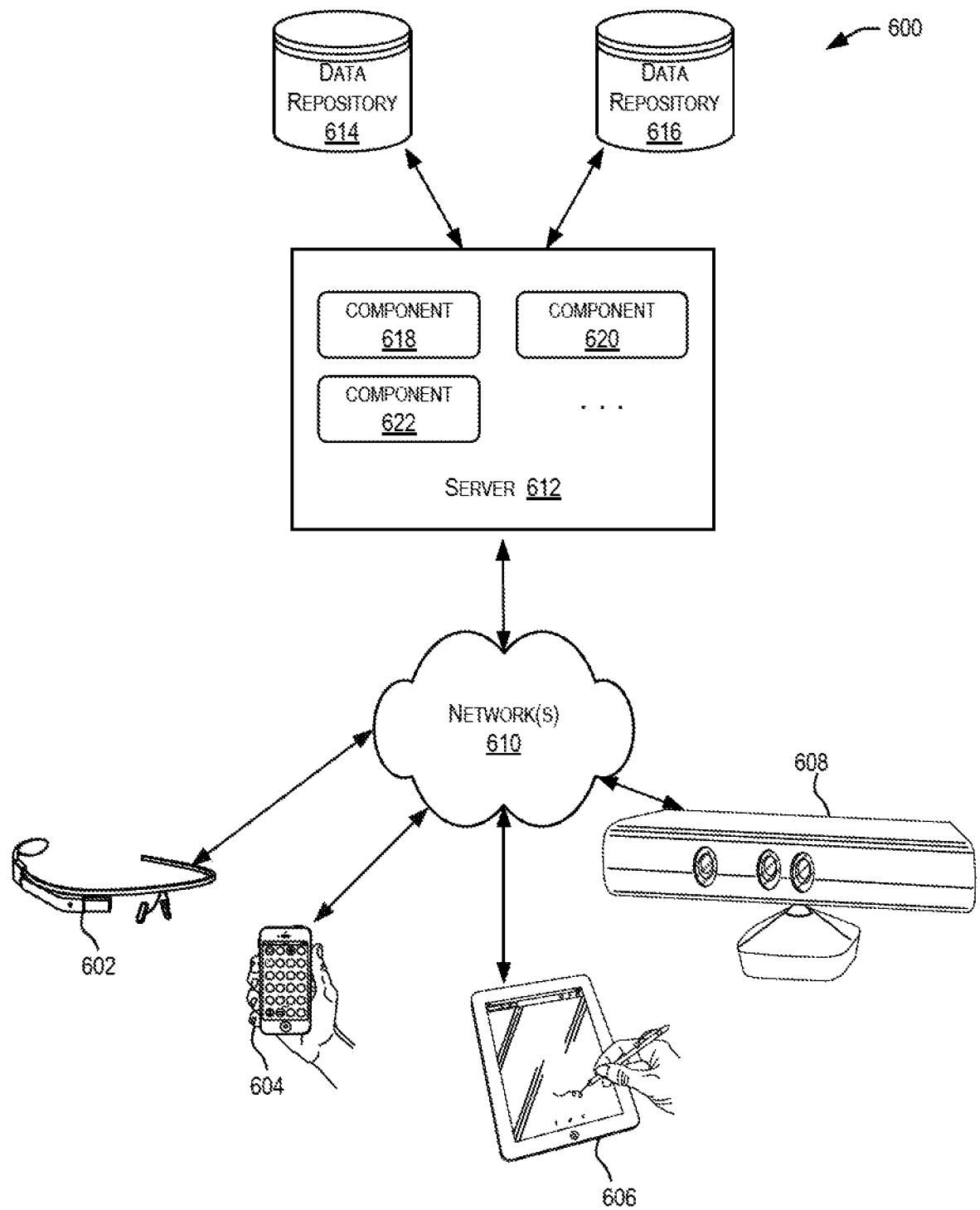
FIG. 6 is a diagram of a distributed system for implementing certain embodiments described herein.

FIG. 6 is a diagram of a distributed system 600 for implementing certain embodiments. In the illustrated embodiment, distributed system 600 includes one or more client computing devices 602, 604, 606, and 608, coupled to a server 612 via one or more communication networks 610. Clients computing devices 602, 604, 606, and 608 may be configured to execute one or more applications.

In various embodiments, server 612 may be adapted to run one or more services or software applications that enable the use of backpropagation to train ML models of the dialog system 100 as described herein. For instance, server 612 may execute some or all aspects of the training system 150 or some or all aspects of the dialog system 100.

In certain embodiments, server 612 may also provide other services or software applications that can include non-virtual and virtual environments. In some embodiments, these services may be offered as web-based or cloud services, such as under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components. More specifically, for instance, each of client computing devices 602, 604, 606, and/or 608 may be an embedded device configured to execute the dialog system 100 and, further, configured to communicate with server 612 to enable server 612 to train ML models of the dialog system 100 through backpropagation as described herein.

In the configuration depicted in FIG. 6, server 612 may include one or more components 618, 620 and 622 that implement the functions performed by server 612. These components may include software components that may be executed by one or more processors, hardware components, or combinations thereof. It should be appreciated that various different system configurations are possible, which may be different from distributed system 600. The embodiment shown in FIG. 6 is thus one example of a distributed system for implementing an embodiment system and is not intended to be limiting.

Users may use client computing devices 602, 604, 606, and/or 608 to interact with aspects of the dialog system 100 provided by server 612 in accordance with the teachings of this disclosure. A client device may provide an interface (e.g., a speech interface) that enables a user of the client device to interact with the client device. The client device may also output information to the user via this interface. Although FIG. 6 depicts only four client computing devices, any number of client computing devices may be supported.

The client devices may include various types of computing systems such as PA devices, portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 610 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 610 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 612 can include one or more virtual machines running virtual operating systems, or other computing architectures involving virtualization such as one or more flexible pools of logical storage devices that can be virtualized to maintain virtual storage devices for the server. In various embodiments, server 612 may be adapted to run one or more services or software applications that provide the functionality described in the foregoing disclosure.

The computing systems in server 612 may run one or more operating systems including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more data repositories 614, 616. These data repositories may be used to store data and other information in certain embodiments. For example, one or more of data repositories 614, 616 may be used to store seed data 210 or other data required to train ML models of the dialog system 100 by backpropagation as described herein. Data repositories 614, 616 may reside in a variety of locations. For example, a data repository used by server 612 may be local to server 612 or may be remote from server 612 and in communication with server 612 via a network-based or dedicated connection. Data repositories 614, 616 may be of different types. In certain embodiments, a data repository used by server 612 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 614, 616 may also be used by applications to store application data. The data repositories used by applications may be of different types such as, for example, a key-value store repository, an object store repository, or a general storage repository supported by a file system.

Figure 7:
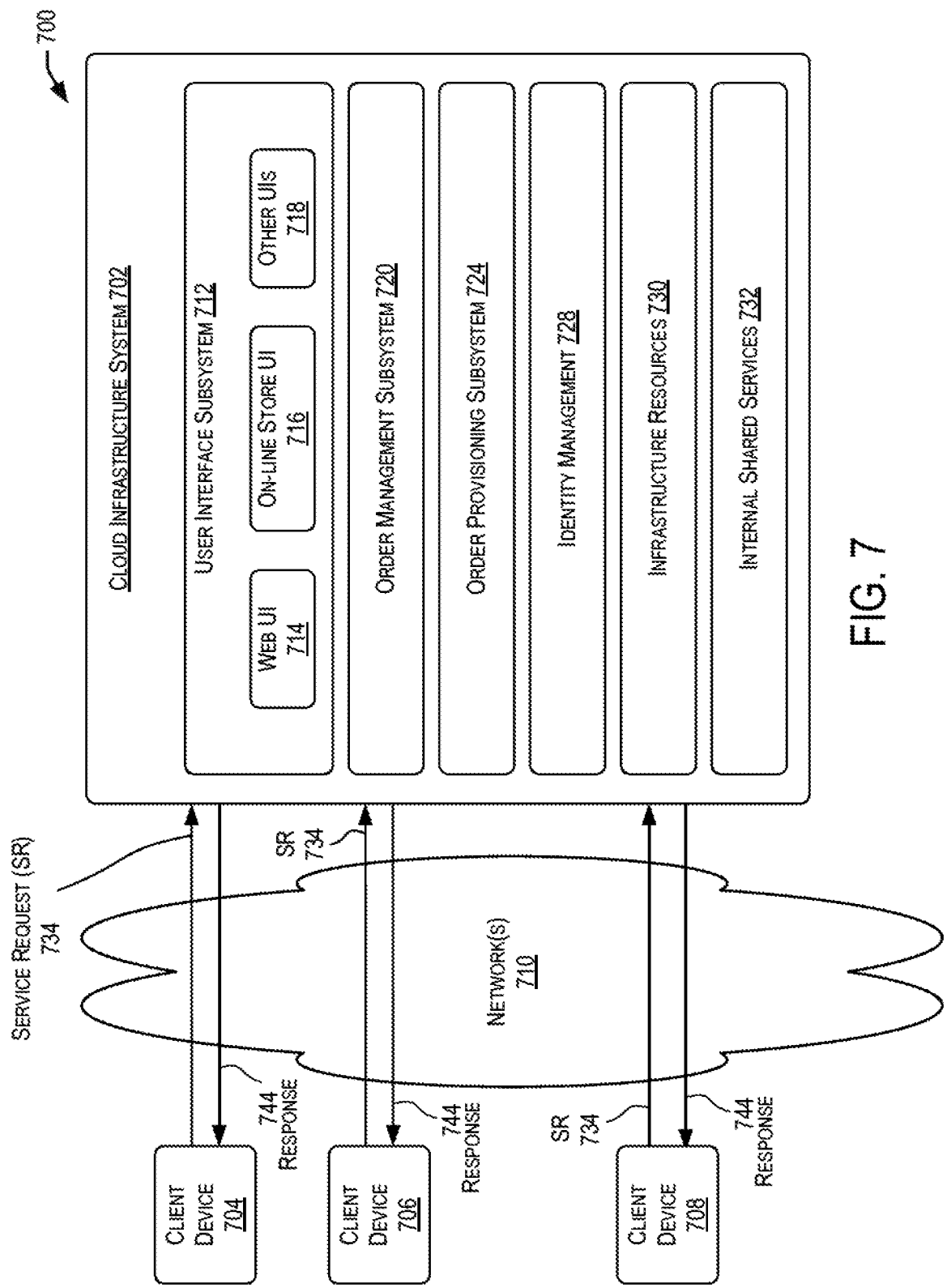
FIG. 7 is a diagram of a cloud-based system environment in which training machine learning models of the dialog system may be offered at least in part as a cloud service, according to certain embodiments described herein.

In certain embodiments, all or a portion of training ML models of the dialog system 100 by backpropagation, as described herein, may be offered as services via a cloud environment. FIG. 7 is a diagram of a cloud-based system environment in which training ML models of the dialog system 100 by backpropagation, as described herein, may be offered at least in part as a cloud service, in accordance with certain embodiments. In the embodiment depicted in FIG. 7, cloud infrastructure system 702 may provide one or more cloud services that may be requested by users using one or more client computing devices 704, 706, and 708. Cloud infrastructure system 702 may comprise one or more computers and/or servers that may include those described above for server 612. The computers in cloud infrastructure system 702 may be organized as general purpose computers, specialized server computers, server farms, server clusters, or any other appropriate arrangement and/or combination.

Network(s) 710 may facilitate communication and exchange of data between client computing devices 704, 706, and 708 and cloud infrastructure system 702. Network(s) 710 may include one or more networks. The networks may be of the same or different types. Network(s) 710 may support one or more communication protocols, including wired and/or wireless protocols, for facilitating the communications.

The embodiment depicted in FIG. 7 is only one example of a cloud infrastructure system and is not intended to be limiting. It should be appreciated that, in some other embodiments, cloud infrastructure system 702 may have more or fewer components than those depicted in FIG. 7, may combine two or more components, or may have a different configuration or arrangement of components. For example, although FIG. 7 depicts three client computing devices, any number of client computing devices may be supported in alternative embodiments.

The term cloud service is generally used to refer to a service that is made available to users on demand and via a communication network such as the Internet by systems (e.g., cloud infrastructure system 702) of a service provider. Typically, in a public cloud environment, servers and systems that make up the cloud service provider's system are different from the customer's own on-premises servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 702 may provide one or more cloud services using different models such as under a Software as a Service (SaaS) model, a Platform as a Service (PaaS) model, an Infrastructure as a Service (IaaS) model, and others, including hybrid service models. Cloud infrastructure system 702 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 702. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 702. Cloud infrastructure system 702 then performs processing to provide the services requested in the customer's subscription order. For example, a customer may subscribe to information services or other services provided by the dialog system 100 in conversational form. Cloud infrastructure system 702 may be configured to provide one or even multiple cloud services.

Cloud infrastructure system 702 may provide the cloud services via different deployment models. In a public cloud model, cloud infrastructure system 702 may be owned by a third party cloud services provider and the cloud services are offered to any general public customer, where the customer can be an individual or an enterprise. In certain other embodiments, under a private cloud model, cloud infrastructure system 702 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 702 and the services provided may be shared by several organizations in a related community. Various other models such as hybrids of the above mentioned models may also be used.

Client computing devices 704, 706, and 708 may be of different types (such as client computing devices 602, 604, 606, and 608 depicted in FIG. 6) and may be capable of operating one or more client applications. A user may use a client computing device to interact with cloud infrastructure system 702, such as to request a service provided by cloud infrastructure system 702. An attacker may use a client device to send malicious requests.

In some embodiments, the processing performed by cloud infrastructure system 702 may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 702 for providing training of ML models by backpropagation as described herein. The data used for this analysis may include structured data (e.g., data stored in a database or structured according to a structured model) and/or unstructured data (e.g., data blobs (binary large objects)).

As depicted in the embodiment in FIG. 7, cloud infrastructure system 702 may include infrastructure resources 730 that are utilized for facilitating the provision of various cloud services offered by cloud infrastructure system 702. Infrastructure resources 730 may include, for example, processing resources, storage or memory resources, networking resources, and the like.

In certain embodiments, to facilitate efficient provisioning of these resources for supporting the various cloud services provided by cloud infrastructure system 702 for different customers, the infrastructure resources 730 may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 702 may itself internally use services 732 that are shared by different components of cloud infrastructure system 702 and that facilitate the provisioning of services by cloud infrastructure system 702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 702 may comprise multiple subsystems. These subsystems may be implemented in software, or hardware, or combinations thereof. As depicted in FIG. 7, the subsystems may include a user interface subsystem 712 that enables users or customers of cloud infrastructure system 702 to interact with cloud infrastructure system 702. User interface subsystem 712 may include various different interfaces such as a web interface 714, an online store interface 716 where cloud services provided by cloud infrastructure system 702 are advertised and are purchasable by a consumer, and other interfaces 718. For example, a customer may, using a client device, request (service request 734) one or more services provided by cloud infrastructure system 702 using one or more of interfaces 714, 716, and 718. For example, a customer may access the online store, browse cloud services offered by cloud infrastructure system 702, and place a subscription order for one or more services offered by cloud infrastructure system 702 that the customer wishes to subscribe to. The service request may include information identifying the customer and one or more services that the customer desires to subscribe to.

In certain embodiments, such as the embodiment depicted in FIG. 7, cloud infrastructure system 702 may comprise an order management subsystem (OMS) 720 that is configured to process the new order. As part of this processing, OMS 720 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 720 may then invoke an order provisioning subsystem (OPS) 724 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 724 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 702 may send a response or notification 744 to the requesting customer to indicate when the requested service is now ready for use. In some instances, information (e.g., a link) may be sent to the customer that enables the customer to start using and availing the benefits of the requested services.

Cloud infrastructure system 702 may provide services to multiple customers. For each customer, cloud infrastructure system 702 is responsible for managing information related to one or more subscription orders received from the customer, maintaining customer data related to the orders, and providing the requested services to the customer. Cloud infrastructure system 702 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 702 may provide services to multiple customers in parallel. Cloud infrastructure system 702 may store information for these customers, including possibly proprietary information. In certain embodiments, cloud infrastructure system 702 comprises an identity management subsystem (IMS) 728 that is configured to manage customers information and provide the separation of the managed information such that information related to one customer is not accessible by another customer. IMS 728 may be configured to provide various security-related services such as identity services, such as information access management, authentication and authorization services, services for managing customer identities and roles and related capabilities, and the like.

Figure 8:
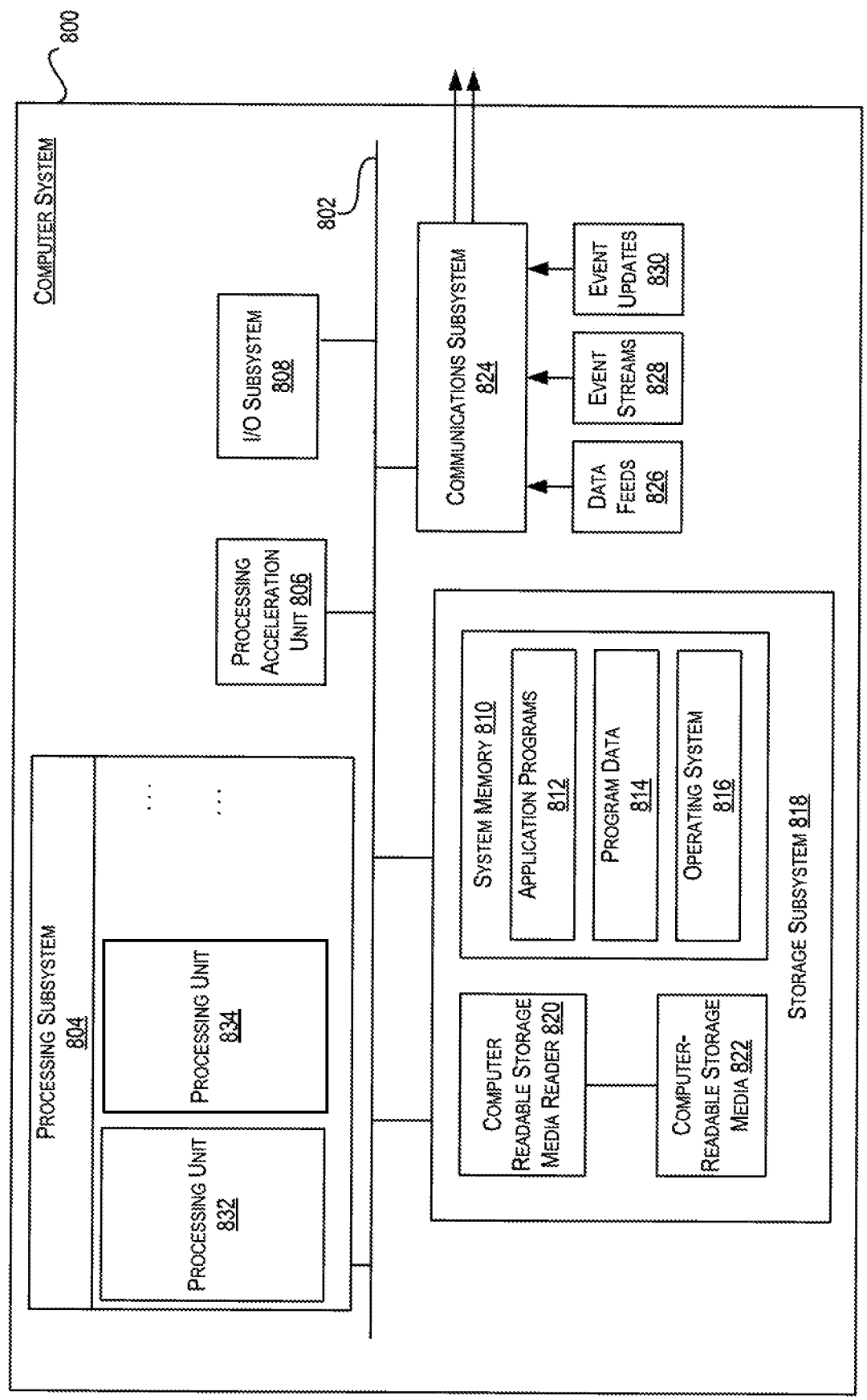
FIG. 8 is a diagram of an example of a computer system that can be used to implement certain embodiments described herein.

FIG. 8 is a diagram of an example computer system 800 that may be used to implement certain embodiments. For example, in some embodiments, computer system 800 may be used to implement any of systems, subsystems, and components described herein. For example, multiple host machines may provide and implement training of ML models of the dialog system 100 by backpropagation as described herein. Computer systems such as computer system 800 may be used as host machines. As shown in FIG. 8, computer system 800 includes various subsystems including a processing subsystem 804 that communicates with a number of other subsystems via a bus subsystem 802. These other subsystems may include a processing acceleration unit 806, an I/O subsystem 808, a storage subsystem 818, and a communications subsystem 824. Storage subsystem 818 may include non-transitory computer-readable storage media including storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 804 controls the operation of computer system 800 and may comprise one or more processors, application specific integrated circuits (ASICs), or field programmable gate arrays (FPGAs). The processors may include be single core or multicore processors. The processing resources of computer system 800 can be organized into one or more processing units 832, 834, etc. A processing unit may include one or more processors, one or more cores from the same or different processors, a combination of cores and processors, or other combinations of cores and processors. In some embodiments, processing subsystem 804 can include one or more special purpose co-processors such as graphics processors, digital signal processors (DSPs), or the like. In some embodiments, some or all of the processing units of processing subsystem 804 can be implemented using customized circuits, such as application specific integrated circuits (ASICs), or field programmable gate arrays (FPGAs).

In some embodiments, the processing units in processing subsystem 804 can execute instructions stored in system memory 810 or on computer-readable storage media 822. In various embodiments, the processing units can execute a variety of programs or code instructions and can maintain multiple concurrently executing programs or processes. At any given time, some or all of the program code to be executed can be resident in system memory 810 and/or on computer-readable storage media 822 including potentially on one or more storage devices. Through suitable programming, processing subsystem 804 can provide various functionalities described above. In instances where computer system 800 is executing one or more virtual machines, one or more processing units may be allocated to each virtual machine.

In certain embodiments, a processing acceleration unit 806 may optionally be provided for performing customized processing or for off-loading some of the processing performed by processing subsystem 804 so as to accelerate the overall processing performed by computer system 800.

I/O subsystem 808 may include devices and mechanisms for inputting information to computer system 800 and/or for outputting information from or via computer system 800. In general, use of the term input device is intended to include all possible types of devices and mechanisms for inputting information to computer system 800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 800 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 818 provides a repository or data store for storing information and data that is used by computer system 800. Storage subsystem 818 provides a tangible non-transitory computer-readable storage medium for storing the basic programming and data constructs that provide the functionality of some embodiments. Storage subsystem 818 may store software (e.g., programs, code modules, instructions) that when executed by processing subsystem 804 provides the functionality described above. The software may be executed by one or more processing units of processing subsystem 804. Storage subsystem 818 may also provide a repository for storing data used in accordance with the teachings of this disclosure.

Storage subsystem 818 may include one or more non-transitory memory devices, including volatile and non-volatile memory devices. As shown in FIG. 8, storage subsystem 818 includes a system memory 810 and a computer-readable storage media 822. System memory 810 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 800, such as during start-up, may typically be stored in the ROM. The RAM typically contains data and/or program modules that are presently being operated and executed by processing subsystem 804. In some implementations, system memory 810 may include multiple different types of memory, such as static random access memory (SRAM), dynamic random access memory (DRAM), and the like.

By way of example, and not limitation, as depicted in FIG. 8, system memory 810 may load application programs 812 that are being executed, which may include various applications such as Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

In certain embodiments, software instructions or code implementing training of ML models of the dialog system 100 by backpropagation, as described herein, may be executed in system memory 810.

Computer-readable storage media 822 may store programming and data constructs that provide the functionality of some embodiments. Computer-readable storage media 822 may provide storage of computer-readable instructions, data structures, program modules, and other data for computer system 800. Software (programs, code modules, instructions) that, when executed by processing subsystem 804 provides the functionality described above, may be stored in storage subsystem 818. By way of example, computer-readable storage media 822 may include non-volatile memory such as a hard disk drive, a magnetic disk drive, an optical disk drive such as a CD ROM, DVD, a Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 818 may also include a computer-readable storage media reader 820 that can further be connected to computer-readable storage media 822. Reader 820 may receive and be configured to read data from a memory device such as a disk, a flash drive, etc.

In certain embodiments, computer system 800 may support virtualization technologies, including but not limited to virtualization of processing and memory resources. For example, computer system 800 may provide support for executing one or more virtual machines. In certain embodiments, computer system 800 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 800. Accordingly, multiple operating systems may potentially be run concurrently by computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to establish a communication channel to one or more client devices via the Internet for receiving and sending information from and to the client devices.

Communication subsystem 824 may support both wired and/or wireless communication protocols. For example, in certain embodiments, communications subsystem 824 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

Communication subsystem 824 can receive and transmit data in various forms. For example, in some embodiments, in addition to other forms, communications subsystem 824 may receive input communications in the form of structured and/or unstructured data feeds 826, event streams 828, event updates 830, and the like. For example, communications subsystem 824 may be configured to receive (or send) data feeds 826 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 824 may be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to communicate data from computer system 800 to other computer systems or networks. The data may be communicated in various different forms such as structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 800 depicted in FIG. 8 is intended only as a specific example. Many other configurations having more or fewer components than the system depicted in FIG. 8 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
selecting from seed data a training tuple comprising an utterance and a logical form corresponding to the utterance;
converting, by a conversion subsystem comprising a sequence of two or more machine learning (ML) models of a dialog system, the logical form selected from the training tuple to a second utterance;
converting, by the conversion subsystem, the second utterance to a converted logical form different from the logical form of the training tuple; and
training the two or more ML models of the dialog system via backpropagation based on comparing the converted logical form to the logical form selected from the training tuple.

2. The method of claim 1, wherein the conversion subsystem configured to convert the logical form to the converted logical form comprises an inverse sequence-to-sequence (seq2seq) model, a semantic parser of the dialog system, an automatic speech recognition (ASR) subsystem of the dialog system, and a text-to-speech (TTS) subsystem of the dialog system.

3. The method of claim 2, wherein:
converting the logical form selected from the training tuple to the second utterance comprises using the inverse seq2seq model to determine the second utterance from the logical form of the training tuple; and
converting the second utterance to the converted logical form comprises:
using the TTS subsystem to determine audio data from the second utterance; and
using the ASR subsystem to determine a third utterance from the audio data; and
using the semantic parser to determine the converted logical form from the second utterance.

4. The method of claim 3, further comprising incorporating the TTS subsystem, the ASR subsystem, and the semantic parser into the dialog system.

5. The method of claim 3, wherein the semantic parser is a sequence-to-sequence neural network, and wherein the inverse sequence-to-sequence model is an inverse of the semantic parser.

6. The method of claim 2, wherein the ASR subsystem is a sequence-to-sequence neural network.

7. The method of claim 2, wherein the TTS subsystem is a sequence-to-sequence neural network.

8. A training system comprising
a conversion subsystem comprising two or more machine learning (ML) models of a dialog system, the conversion subsystem configured to:
input training tuples of seed data, wherein a training tuple of the seed data comprises an utterance and a logical form; and
convert the logical form selected from the training tuple to a second utterance;
convert the second utterance to a converted logical form different from the logical form of the training tuple;
wherein the training system is configured to train the two or more ML models of the dialog system via backpropagation based on comparing the converted logical form to the logical form,
wherein, after training, the two or more ML models of the conversion subsystem are incorporated into the dialog system configured to provide a dialog.

9. The training system of claim 8, wherein to convert the logical form selected from the training tuple to the second utterance, the conversion subsystem is further configured to:
use a text-to-speech (TTS) subsystem, selected from the dialog system, to determine audio data based on the logical form selected from the training tuple of the seed data; and
use an automatic speech recognition (ASR) subsystem, selected from the dialog system, to determine the second utterance from the audio data.

10. The training system of claim 8, wherein:
to convert the logical form selected from the training tuple to the second utterance, the conversion subsystem is configured to:
use an inverse sequence-to-sequence model to determine an intermediate utterance from the logical form selected from the training tuple,
wherein the inverse sequence-to-sequence model is an inverse of a semantic parser of the dialog system; and
convert the intermediate utterance to the second utterance; and
to convert the second utterance to the converted logical form, the conversion subsystem is configured to use the semantic parser to determine the converted logical form from the second utterance.

11. The training system of claim 10, wherein the semantic parser is a sequence-to-sequence neural network.

12. The training system of claim 9, wherein the ASR subsystem is a sequence-to-sequence neural network.

13. The training system of claim 9, wherein the TTS subsystem is a sequence-to-sequence neural network.

14. A computer-program product for training machine learning models of a dialog system, the computer-program product comprising a non-transitory computer-readable storage medium having program instructions embodied thereon, the program instructions executable by one or more processors to cause the one or more processors to perform a method comprising:
selecting from seed data a training tuple comprising an utterance and a logical form;
using two or more machine learning (ML) models of a dialog system to convert the logical form selected from the training tuple to a second utterance;
using a text-to-speech (TTS) subsystem of the dialog system, an automatic speech recognition (ASR) subsystem of the dialog system, and a semantic parser of the dialog system to convert the second utterance to a converted logical form different from the logical form of the training tuple; and
training the TTS subsystem, the ASR subsystem, and the semantic parser of the dialog system via backpropagation based on comparing the converted logical form to the logical form selected from the training tuple.

15. The computer-program product of claim 14, wherein converting the logical form selected from the training tuple to the second utterance further comprises utilizing an inverse sequence-to-sequence model to determine the second utterance from the logical form selected from the training tuple, wherein the inverse sequence-to-sequence model is an inverse of the semantic parser of the dialog system.

16. The computer-program product of claim 15, wherein using the TTS subsystem of the dialog system, the ASR subsystem of the dialog system, and the semantic parser of the dialog system to convert the second utterance to a converted logical form further comprises:
using the TTS subsystem to determine audio data from the first second utterance;
using the ASR subsystem to determine an additional utterance from the audio data; and
using the semantic parser to determine the converted logical form from the additional utterance.

17. The computer-program product of claim 15, wherein each of the semantic parser and the inverse sequence-to-sequence model is a respective sequence-to-sequence neural network.

18. The computer-program product of claim 16, wherein the inverse sequence-to-sequence model, the TTS subsystem, the ASR subsystem, and the semantic parser translate the logical form to the converted logical form, and wherein the converted logical form differs from the logical form.

19. The method of claim 1, wherein:
converting to the second utterance the logical form selected from the training tuple comprises using an inverse of a semantic parser of the dialog system; and
converting the second utterance to the converted logical form comprises and using a text-to-speech (TTS) subsystem of the dialog system, using an automatic speech recognition (ASR) subsystem of the dialog system, and using the semantic parser of the dialog system.

20. The method of claim 1, wherein the second utterance differs from the utterance of the training tuple.

* * * * *

UNITED STATES PATENT AND TRADEMARK OFFICE
CERTIFICATE OF CORRECTION

PATENT NO. : 11,508,359 B2
APPLICATION NO. : 17/002229
DATED : November 22, 2022
INVENTOR(S) : Thanh Long Duong and Mark Edward Johnson It is certified that error appears in the above-identified patent and that said Letters Patent is hereby corrected as shown below:

In the Claims

Column 30, Line 36, Claim 16, delete the word "first"

Signed and Sealed this
Twenty-seventh Day of December, 2022

*Katherine Kelly Vidal*

Katherine Kelly Vidal
*Director of the United States Patent and Trademark Office*